(12) United States Patent
Yasui et al.

(10) Patent No.: US 11,712,903 B2
(45) Date of Patent: Aug. 1, 2023

(54) PRINTING DATA CREATING APPARATUS, NONTRANSITORY STORAGE MEDIUM STORING PROGRAM READABLE BY PRINTING DATA CREATING APPARATUS, AND PRINTING SYSTEM

(71) Applicant: Brother Kogyo Kabushiki Kaisha, Nagoya (JP)

(72) Inventors: Ryo Yasui, Nagoya (JP); Jun Komura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 179 days.

(21) Appl. No.: 17/152,938

(22) Filed: Jan. 20, 2021

(65) Prior Publication Data

US 2021/0237476 A1 Aug. 5, 2021

(30) Foreign Application Priority Data

Jan. 31, 2020 (JP) .................................. 2020-015151

(51) Int. Cl.
  *B41J 3/407* (2006.01)
  *B41J 11/48* (2006.01)
  *B41J 3/46* (2006.01)

(52) U.S. Cl.
  CPC ............... *B41J 3/4075* (2013.01); *B41J 3/46* (2013.01); *B41J 11/485* (2013.01)

(58) Field of Classification Search
  CPC ........... B41J 3/4075; B41J 3/46; B41J 11/485
  See application file for complete search history.

(56) References Cited

U.S. PATENT DOCUMENTS

| | | | |
|---|---|---|---|
| 2006/0114487 A1* | 6/2006 | Caveney, Jr. | G06F 3/1253 358/1.13 |
| 2006/0224780 A1* | 10/2006 | Saito | G06F 3/1204 710/8 |
| 2006/0263132 A1 | 11/2006 | Yamamoto et al. | |
| 2009/0235190 A1* | 9/2009 | Hoo | G06Q 10/06 715/763 |
| 2009/0279125 A1* | 11/2009 | Liu | G06F 3/1205 358/1.15 |
| 2012/0183340 A1 | 7/2012 | Kanamoto | |

(Continued)

FOREIGN PATENT DOCUMENTS

| | | |
|---|---|---|
| JP | 2004-148762 A | 5/2004 |
| JP | 2006-248172 A | 9/2006 |
| JP | 2012-148435 A | 8/2012 |

*Primary Examiner* — David H Banh
(74) *Attorney, Agent, or Firm* — Burr Patent Law, PLLC

(57) ABSTRACT

A printing data creating apparatus comprises a display, a transmitter, a controller, an input unit, and a storage. The controller is configured to display a label creation screen for the label including an attribution information input field and a standard label instruction field for instructing edition of a standard label in accordance with a prescribed standard, when the standard label instruction field is operated, display a plurality of standard input fields in addition to the attribution information input field, each of the plurality of standard input fields being a input field to which standard information as information in accordance with the prescribed standard is input, create printing data of the standard label, and transmit the created printing data of the standard label from the transmitter to the printing apparatus.

11 Claims, 14 Drawing Sheets

(56) References Cited

U.S. PATENT DOCUMENTS

2014/0324521 A1* 10/2014 Mun ................. G06Q 30/0201
  705/7.28
2015/0287289 A1* 10/2015 Lewis ................ G07F 19/2055
  235/379

* cited by examiner

PRINTING DATA CREATING APPARATUS, NONTRANSITORY STORAGE MEDIUM STORING PROGRAM READABLE BY PRINTING DATA CREATING APPARATUS, AND PRINTING SYSTEM

CROSS REFERENCE TO RELATED APPLICATION

The present application claims priority from Japanese Patent Application No. 2020-015151, which was filed on Jan. 31, 2020, the disclosure of which is herein incorporated by reference in its entirety.

BACKGROUND

The following disclosure relates to a printing data creating apparatus, a non-transitory storage medium storing a program readable by the printing data creating apparatus, and a printing system.

There is known a tape creating apparatus capable of creating labels by executing printing on a tape wound in a roll shape. When a label to be adhered to a cable is created in the tape creating apparatus, an outer diameter of the cable and respective characters of a character string to be printed on the labels are input from a keyboard provided in the tape creating apparatus.

SUMMARY

In a case where labels based on a prescribed standard such as a TIA standard are created in a related-art tape creating apparatus, it is necessary for a user to check a format of the prescribed standard and to input all the contents in accordance with the contents of the format, which is troublesome.

Accordingly, an aspect of the disclosure relates to a printing data creating apparatus, a non-transitory storage medium storing a program readable by the printing data creating apparatus, and a printing system capable of easily creating a label in accordance with a prescribed standard.

In one aspect of the disclosure, a printing data creating apparatus includes a display configured to display an image, a transmitter configured to transmit printing data to a printing apparatus which prints a label, a controller, an input unit to which an instruction for the controller is input, and a storage storing a program for controlling the controller. The controller is configured to display, on the display, a label creation screen for the label including an attribution information input field to which attribution information for creating the label is input and a standard label instruction field for instructing edition of a standard label in accordance with a prescribed standard, when the standard label instruction field is operated by input to the input unit, display, on the label creation screen, a plurality of standard input fields in addition to the attribution information input field, each of the plurality of standard input fields being a input field to which standard information as information in accordance with the prescribed standard is input, create printing data of the standard label based on the standard information input in the plurality of standard input fields, and transmit the created printing data of the standard label from the transmitter to the printing apparatus.

In another aspect of the disclosure, a non-transitory storage medium storing a program readable by a computer of a printing data creating apparatus. The printing data creating apparatus comprises a display configured to display an image, a transmitter configured to transmit printing data to a printing apparatus which prints a label, and an input unit to which an instruction is input. When executed by the computer, the program causes the printing data creating apparatus to display, on the display, a label creation screen for the label including an attribute information input field in which attribute information for creating the label is input and a standard label instruction field for instructing edition of a standard label in accordance with a prescribed standard, when the standard label instruction field is operated by input to the input unit, display, on the label creation screen, a plurality of standard input fields in addition to the attribution information input field, each of the plurality of standard input fields being a input field to which standard information as information in accordance with the prescribed standard is input, create printing data of the standard label based on the standard information input in the plurality of standard input fields, and transmit the created printing data of the standard label from the transmitter to the printing apparatus.

In another aspect of the disclosure, a printing system includes a printing data creating apparatus; and a printing apparatus which prints a label by printing data transmitted from the printing data creating apparatus. The printing data creating apparatus includes a display configured to display an image, a transmitter configured to transmit printing data to the printing apparatus, a controller, an input unit to which an instruction for the controller is input, and a storage storing a program for controlling the controller. The controller is configured to display, on the display, a label creation screen for the label including an attribution information input field to which attribution information for creating the label is input and a standard label instruction field for instructing edition of a standard label in accordance with a prescribed standard, when the standard label instruction field is operated by input to the input unit, display, on the label creation screen, a plurality of standard input fields in addition to the attribution information input field, each of the plurality of standard input fields being a input field to which standard information as information in accordance with the prescribed standard is input, create printing data of the standard label based on the standard information input in the plurality of standard input fields, and transmit the created printing data of the standard label from the transmitter to the printing apparatus. The printing apparatus includes a receiver configured to receive the printing data, and a printing unit configured to print the label based on the printing data received by the receiver.

In another aspect of the disclosure, a printing data creating apparatus includes a display configured to display an image, a transmitter configured to transmit printing data to a printing apparatus which prints a label, a controller, an input unit to which an instruction for the controller is input, and a storage storing a program for controlling the controller. The controller is configured to display, on the display device, an editing screen containing a plurality of standard input fields in which information in accordance with a prescribed standard is input, and create printing data in which at least one delimiter is inserted between a first character string and a second character string respectively input in a first input field and a second input field adjacent to each other in the plurality of standard input fields.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Figure 1:
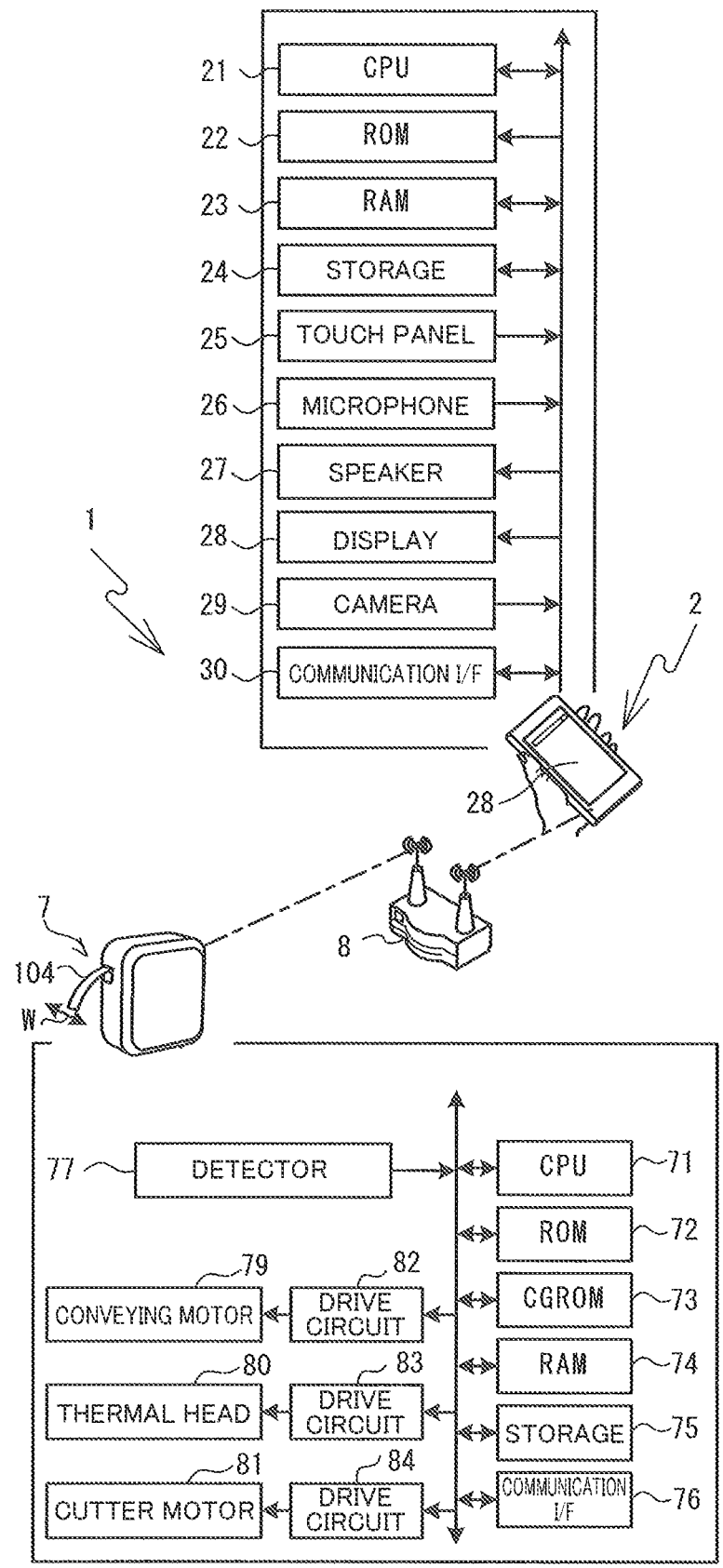
FIG. 1 is a block diagram illustrating a configuration of a printing system and electrical configurations of a mobile terminal and a printing apparatus.

Hereinafter, an embodiment embodying the present disclosure will be explained in order with reference to the drawings. As illustrated in FIG. 1, a printing system 1 includes a mobile terminal 2 and a printing apparatus 7. The mobile terminal 2 and the printing apparatus 7 are connected by a router 8 and communicable with each other, and the printing apparatus 7 prints printing data transmitted from the mobile terminal 2.

The mobile terminal 2 is a well-known smart phone as an example, including a CPU 21, a ROM 22, a RAM 23, a storage 24, a touch panel 25, a microphone 26, a speaker 27, a display 28, a camera 29, and a communication I/F 30. The CPU 21 executes a control of the mobile terminal 2, which is electrically connected to other components through not-illustrated interface circuit. The ROM 22 stores a boot program and so on. The RAM 23 stores a timer, a counter, flag data, and temporary data. The storage 24 is configured by a storage medium such as a flash memory. The storage 24 stores programs of a processing executed by the CPU 21. The storage 24 stores various programs such as an operating system (hereinafter referred to as "OS") and applications executed on the OS. As an example, the storage 24 stores programs of later-described printing data creating processing. The touch panel 25 is provided so as to be superimposed on the display 28, and the touch panel 25 functions as an input unit configured to detect a position where a touch operation is made and configured to input an instruction to the CPU 21. The microphone 26 converts surrounding sound into sound data and outputs the data. The speaker 27 outputs sound based on the input sound data. The display 28 displays an image based on image data. An example of the display 28 is a liquid crystal display or an organic electroluminescence display. The camera 29 generates a captured image obtained by capturing an imaging range and outputs the image. The communication I/F 30 includes a communication module of a router connecting to a LAN 3 and a public network 4 through the router 8 and a communication module for directly connecting to the public network 4.

The printing apparatus 7 is a small-sized label printer capable of printing characters (characters, signs, numerals, and so on) on a tape 104 which is a tape-shaped printing medium and an indefinite-length adhesive tape with release paper. The printing apparatus 7 is capable of executing printing based on printing data transmitted from the mobile terminal 2. The printing apparatus 7 includes a CPU 71, a ROM 72, a CGROM 73, a RAM 74, a storage 75, and a communication I/F 76. The ROM 72, the CGROM 73, the RAM 74, the storage 75, and the communication I/F 76 are electrically connected to the CPU 71 respectively.

Various programs and so on necessary for controlling the printing apparatus 7 are stored in the ROM 72. The CPU 71 executes various operations based on these programs. In the CGROM 73, printing dot pattern data for printing various characters is stored while being classified on the basis of each of forms and sizes so as to correspond to code data. In the RAM 74, a plurality of storage areas such as a text memory and a print buffer are provided. Data to be printed is stored in the text memory. The printing dot pattern to be printed is stored in the print buffer. Various calculation data and so on are stored in other storage areas. The communication I/F 76 is a communication module for connecting to the router 8.

The printing apparatus 7 further includes a detector 77, a conveying motor 79, a thermal head 80, a cutter motor 81, and drive circuits 82 to 84. The detector 77 and the drive circuits 82 to 84 are electrically connected to the CPU 71, respectively. The detector 77 is a well-known sensor configured to detect a type of the tape 104 mounted on the printing apparatus 7 and output the type of the tape 104 to the CPU 71. Regarding types of the tape 104, there are a laminate type, a receptor type, lengths in a width direction of the tape (hereinafter referred to as the "width of the tape"), colors of the tape, colors of an ink ribbon, material and so on. Information of the type of the tape detected by the detector 77 is transmitted from the CPU 71 to the mobile terminal 2 through the communication I/F 76 via the router 8, and is input to the CPU 21 through the communication I/F 30. The drive circuit 82 is an electronic circuit for driving the conveying motor 79 for conveying the tape 104 along a conveying path. The drive circuit 83 is an electronic circuit for driving the thermal head 80. The drive circuit 84 is an electronic circuit for driving the cutter motor 81 configured to operate a movable blade (not illustrated) for cutting the printed tape 104 to be discharged outside the printing apparatus 7.

When printing data transmitted from the communication I/F 30 of the mobile terminal 2 is received by the communication I/F 76 of the printing apparatus 7, and the printing data is input to the CPU 71, the CPU 71 drives the conveying motor 79, the thermal head 80, and the cutter motor 81 and executes printing based on the printing data.

Figure 2:
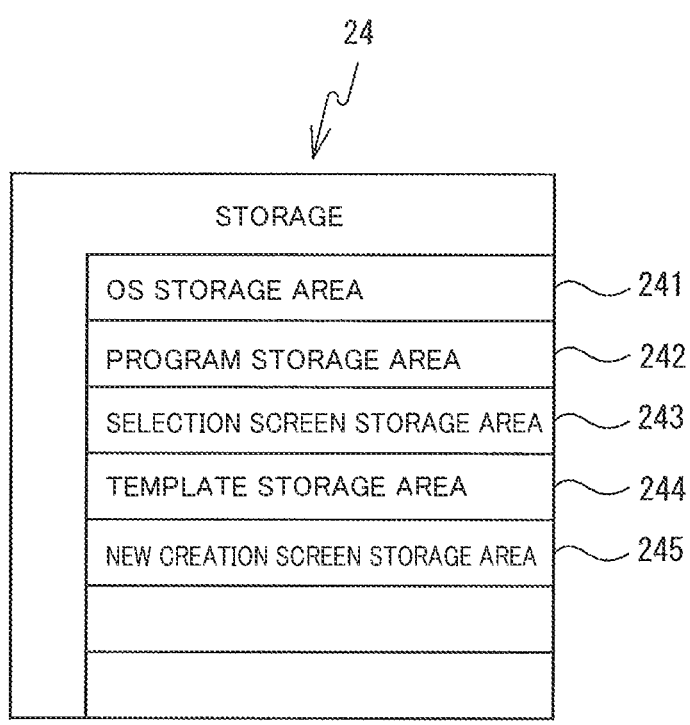
FIG. 2 is a conceptual diagram of respective storage areas in a storage of the mobile terminal.

Respective storage areas of the storage 24 in the mobile terminal 2 will be explained with reference to FIG. 2. The storage 24 is provided with an OS storage area 241 storing the OS, a program storage area 242 storing various programs executed by the CPU 21, a selection screen storage area 243 storing data of later-descried selection screens, a template storage area 244 storing data of later-described template screens, a new creation screen storage area 245 storing data of a later-described new creation screen, and the like.

Printing data creation processing executed by the CPU 21 of the mobile terminal 2 will be explained with reference to FIG. 3 to FIGS. 13A, 13B. When an icon (not illustrated) of an application for the printing data creation processing displayed on the touch panel 25 is touched, information obtained by touching the icon for the printing data creation processing is output from the touch panel 25 to the CPU 21. The CPU 21 reads a program for the printing data creation processing stored in the program storage area 242 of the storage 24 and moves the program to the RAM 23, and executes the program.

Figure 3:
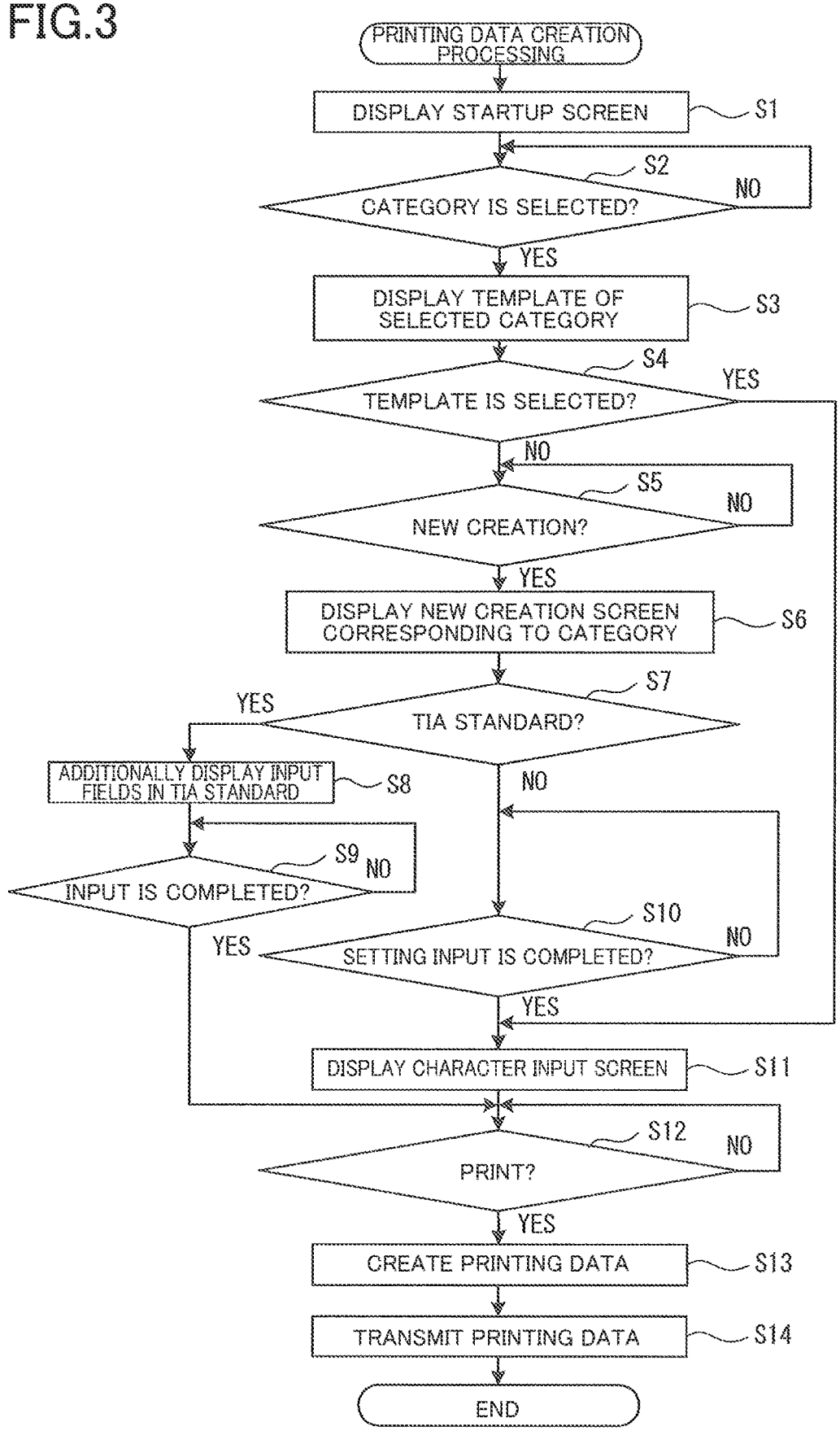
FIG. 3 is a flowchart of printing data creation processing.
Figure 4:
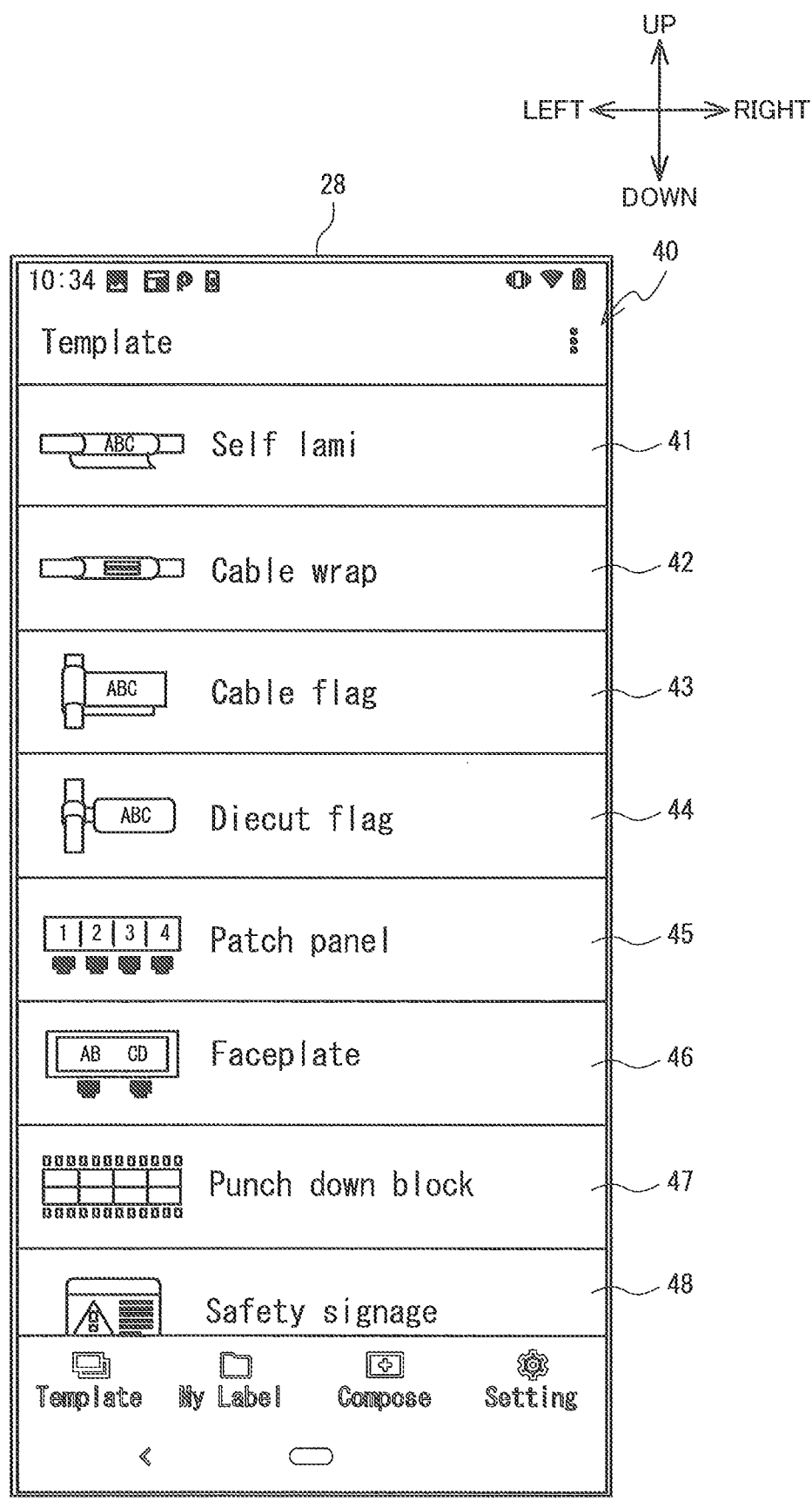
FIG. 4 is a diagram illustrating a state in which a category selection screen is displayed on a display.

Hereinafter, the printing data creation processing will be explained with reference to a flowchart of FIG. 3. When the CPU 21 of the mobile terminal 2 starts the printing data creation processing, a startup screen is displayed on the display 28 (51). Specifically, the CPU 21 reads information of a category selection screen 40 as the startup screen from the selection screen storage area 243 of the storage 24, and displays the category selection screen 40 on the display 28 as illustrated in FIG. 4 (51). On the category selection screen 40, selection fields 41 to 48 of categories for various types of labels which can be created by the printing apparatus 7 are displayed in a line in a vertical direction on the category selection screen 40. For example, a drawing and characters "Self lami" indicating a self-laminate is displayed in the selection field 41. In the selection field 42, a drawing and characters "Cable wrap" indicating a cable wrap is displayed. In the selection field 43, a drawing and characters "Cable flag" indicating a cable flag is displayed. In the selection field 44, a drawing and characters "Diecut flag" indicating a die-cut flag is displayed. In the selection field 45, a drawing and characters "Patch panel" indicating a patch panel is displayed. In the selection field 46, a drawing and characters "Face plate" indicating a face plate is displayed. In the selection field 47, a drawing and characters "Punch down block" indicating a punch-down block is displayed. In the selection field 48, a drawing and characters "Safety signage" indicating safety signage is displayed.

The self-laminate is a label to be wound around a cable and stuck so that a transparent part of the label is overlaid on a printed part of characters to thereby laminate a character part. The cable wrap is a label wound around the cable. The cable flag is a label in which a central part of the label is wound around the cable and a printed part of characters becomes a flag. The die-cut flag is a label in which a character part of the label is a die-cut flag and a central part of the label is wound around the cable. The patch panel is a label to be stuck to a patch panel in which a plurality of female jacks of connectors are aligned, and indicates numbers of respective jacks. The face plate is a label to be stuck to a face plate around female jacks of connectors. The punch-down block is a label to be stuck to a punch down block which is a fixing member of wiring provided on a wiring board.

Next, the CPU 21 determines whether one of the plurality of categories has been selected or not (S2). For example, when a user touches one of the selection fields 41 to 48 on the category selection screen 40, the touch panel 25 detects a touched position and inputs information of the touched position to the CPU 21. The CPU 21 determines that the category is selected when determining that one of the selection fields 41 to 48 has been touched based on position information from the touch panel 25 (S2: YES). When the input of the position information from the touch panel 25 does not exist or when the CPU 21 does not determine that one of the selection fields 41 to 48 has been touched based on the position information from the touch panel 25 (S2: NO), determination of S2 is continued.

Next, when the CPU 21 determines that the category is selected after one of the selection fields 41 to 48 on the category selection screen 40 is touched (S2: YES), the CPU 21 reads information of a template selection screen corresponding to the selected category from the template storage area 244 in the storage 24, and displays the template selection screen on the display 28 (S3). For example, the CPU 21 displays a template selection screen 42A for the cable wrap illustrated in FIG. 5 on the display screen 28 when it is determined that the selection screen 42 on the category selection screen 40 has been touched (S2: YES). On the template selection screen 42A, templates 421 to 425 and a new creation button 426 are displayed. For example, the templates 421 to 424 correspond to diameters 5 mm, 4 mm, 3 mm, and 10 mm of the cables, respectively.

When the CPU 21 determines that one of the templates 421 to 425 on the template selection screen 42A has been touched, the CPU 21 displays a character input screen corresponding to the selected template on the display 28 (S11). The character input screen is a screen in which the selected template is displayed in an enlarged manner on the display 28 and characters can be input in a frame. For example, when the template 421 of the template selection screen 42A is touched (S4: YES), the CPU 21 displays the template 421 on the display 28 in the enlarged manner, and characters (1A to A01) in the template 421 can be freely changed.

Figure 5:
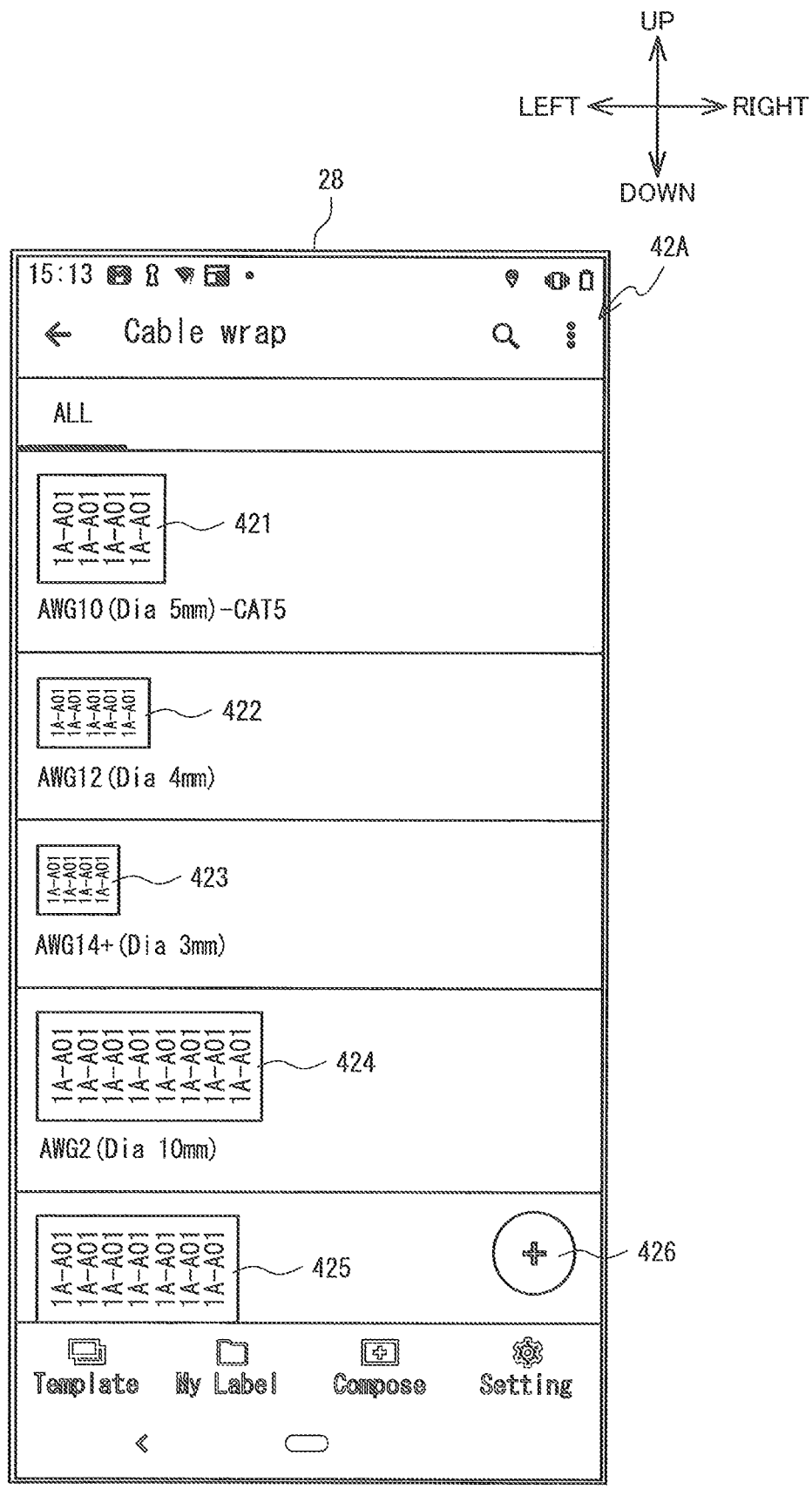
FIG. 5 is a diagram illustrating a state in which a template selection screen of a cable wrap is displayed on the display.

When the CPU 21 determines that the new creation button 426 on the template selection screen 42A illustrated in FIG. 5 has been touched by the user based on the position information from the touch panel 25, the CPU 21 determines an execution of new creation of printing data without using the template (S4: NO, S5: YES). When the CPU 21 does not determine that the new creation button 426 has been touched by the user (S5: NO), the determination of S5 is continued. When the CPU 21 determines that the new creation button 426 on the template selection screen 42A has been touched by the user (S5: YES), the CPU 21 reads information for a new creation screen 52 (see FIG. 6) of the cable wrap corresponding to "Cable wrap" as the category selected at S2 from the new creation screen storage area 245 in the storage 24, and displays the new creation screen 52 on the display 28.

Figure 6:
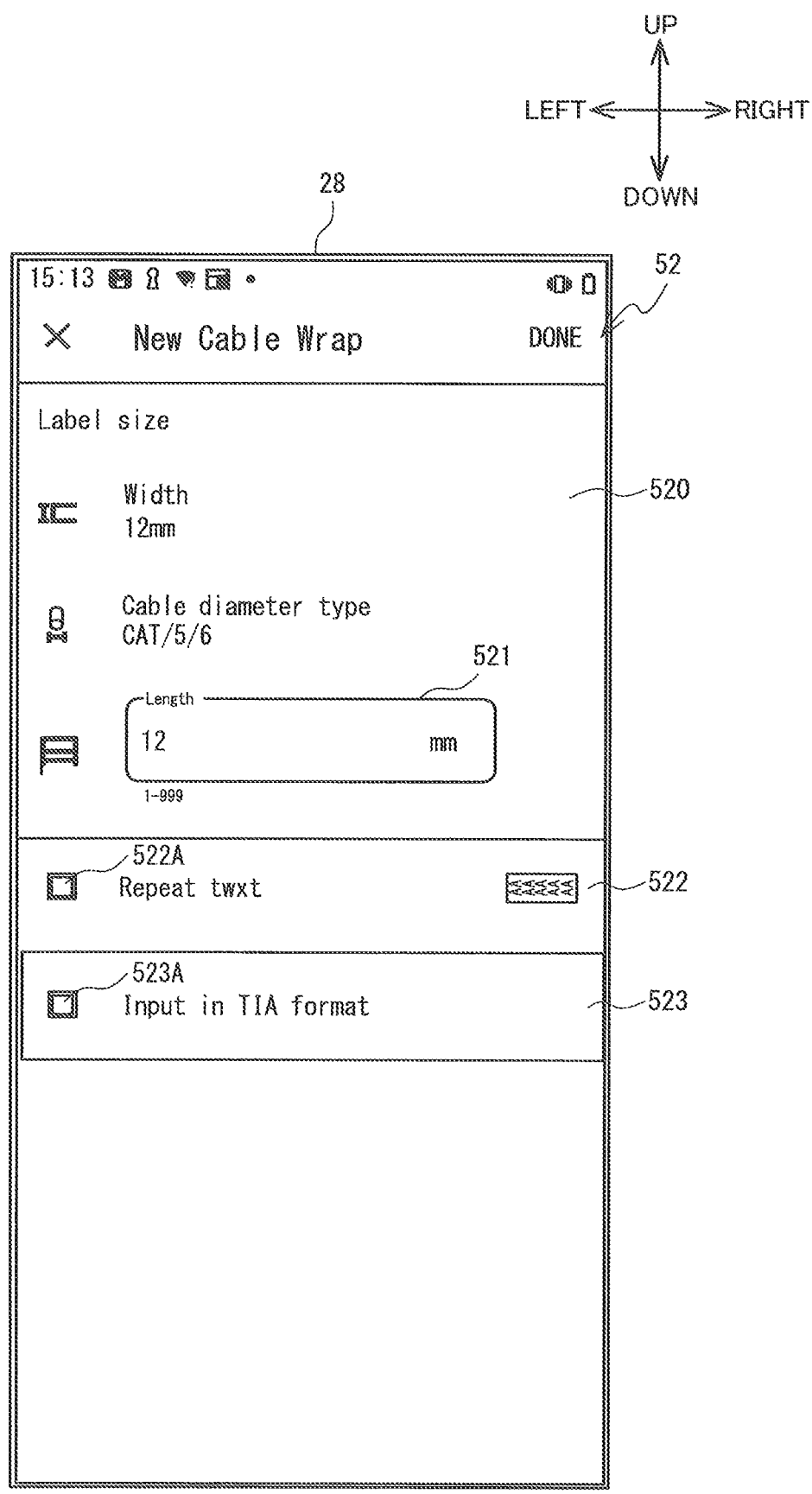
FIG. 6 is a diagram illustrating a state in which a new creation screen of the cable wrap is displayed on the display.

As illustrated in FIG. 6, an attribute information input field 520 for a label size to be created is displayed on the new creation screen 52. In the attribute information input field 520, a width of the label to be created (Width), a diameter type of the cable to which the label is stuck (Cable diameter type), and a setting field 521 for a length of the label (Length) are displayed. Regarding the width of the label, the CPU 21 displays a numerical value of a tape width based on information of the type of the tape 104 detected by the detector 77 of the printing apparatus 7 and transmitted to the mobile terminal 2. For example, when the width of the tape 104 is 12 mm, the CPU 21 displays "Width 12 mm". Regarding the diameter type of the cable, for example, "CAT/5/6" which is a standard of a LAN cable is displayed as an initial value. In the setting field 521 for the length of the label, the length of the label to be created can be input from the touch panel 25. In an example illustrated in FIG. 6, "12 mm" is input. A numerical value in the setting field 521 can be arbitrarily changed. In a lower part of the setting field 521, a range of the length which can be input in the setting field is displayed. "1 to 999" is displayed as an example. The diameter type of the cable can be arbitrarily changed by input from the touch panel 25 when "CAT/5/6" is touched by the user.

A repetition instruction field 522 for instructing a case where the same characters are repeated (Repeat text) is provided below the attribute information input field 520 for a label size. In the repetition instruction field 522, a checkbox 522A to be checked when the same characters are repeated is provided on a left end. Moreover, a standard label editing instruction field 523 for instructing edition of a standard label in accordance with a prescribed standard is provided below the checkbox 522A. An example of the prescribed standard is a TIA standard (ANSI/TIA-568-C). The TIA standard is a standard for information wiring and wiring material at the termination of the LAN cable specified by American National Standards Institute (ANSI). The TIA standard specifies information wiring chiefly in office buildings. Information (a character string) necessary for label printing of the cable wrap to be stuck to the LAN cable in the TIA standard will be described later.

In the standard label editing instruction field 523, as an example. a checkbox 523A to be checked when creating a label in the TIA standard is provided at a left end. On a right side of the checkbox 523A, "Input in TIA format" is displayed, which indicates that input in the TIA standard is executed.

Figure 7:
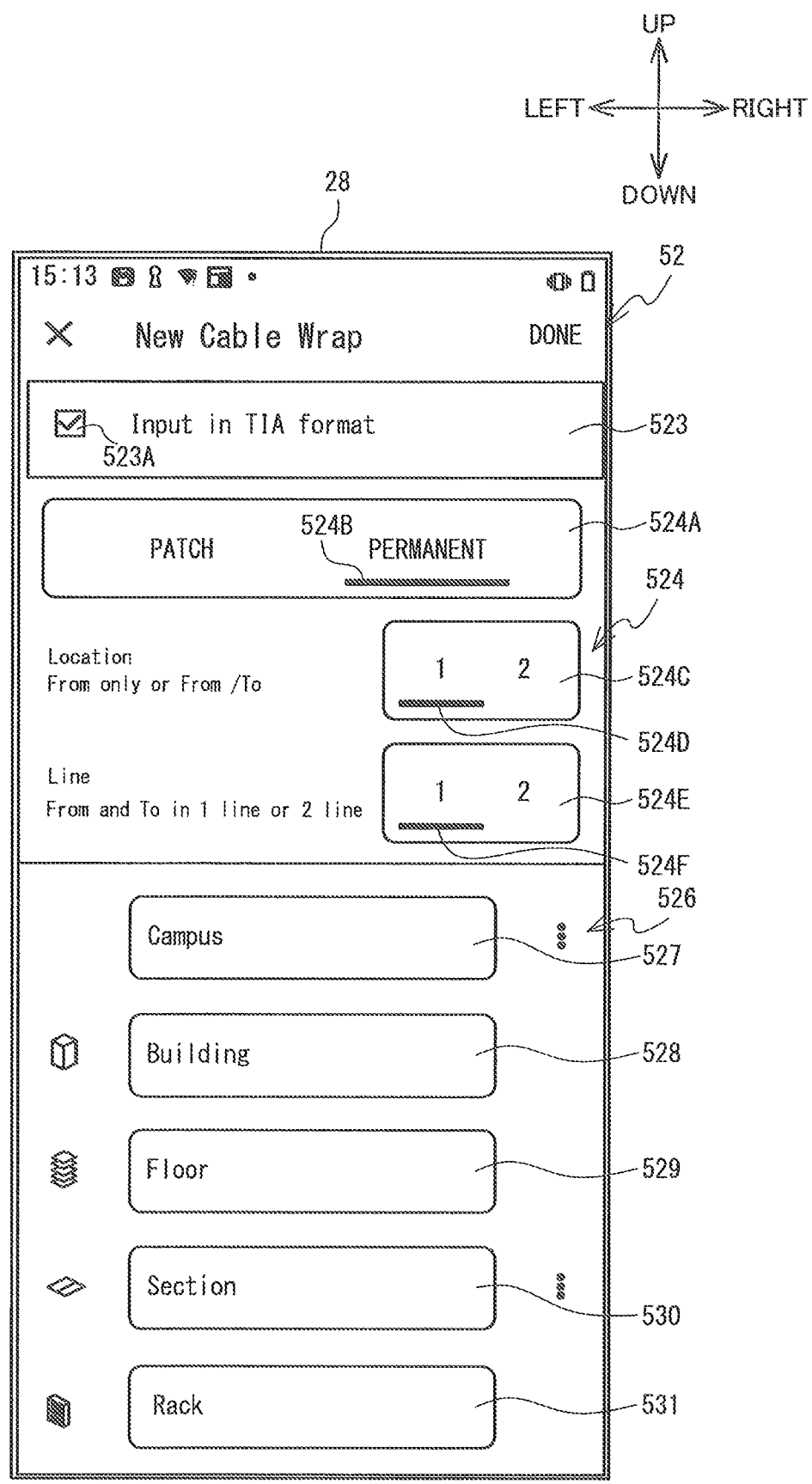
FIG. 7 is a diagram of the first half illustrating a state in which standard input fields in a TIA standard are additionally displayed on the new creation screen of the cable wrap displayed on the display.
Figure 8:
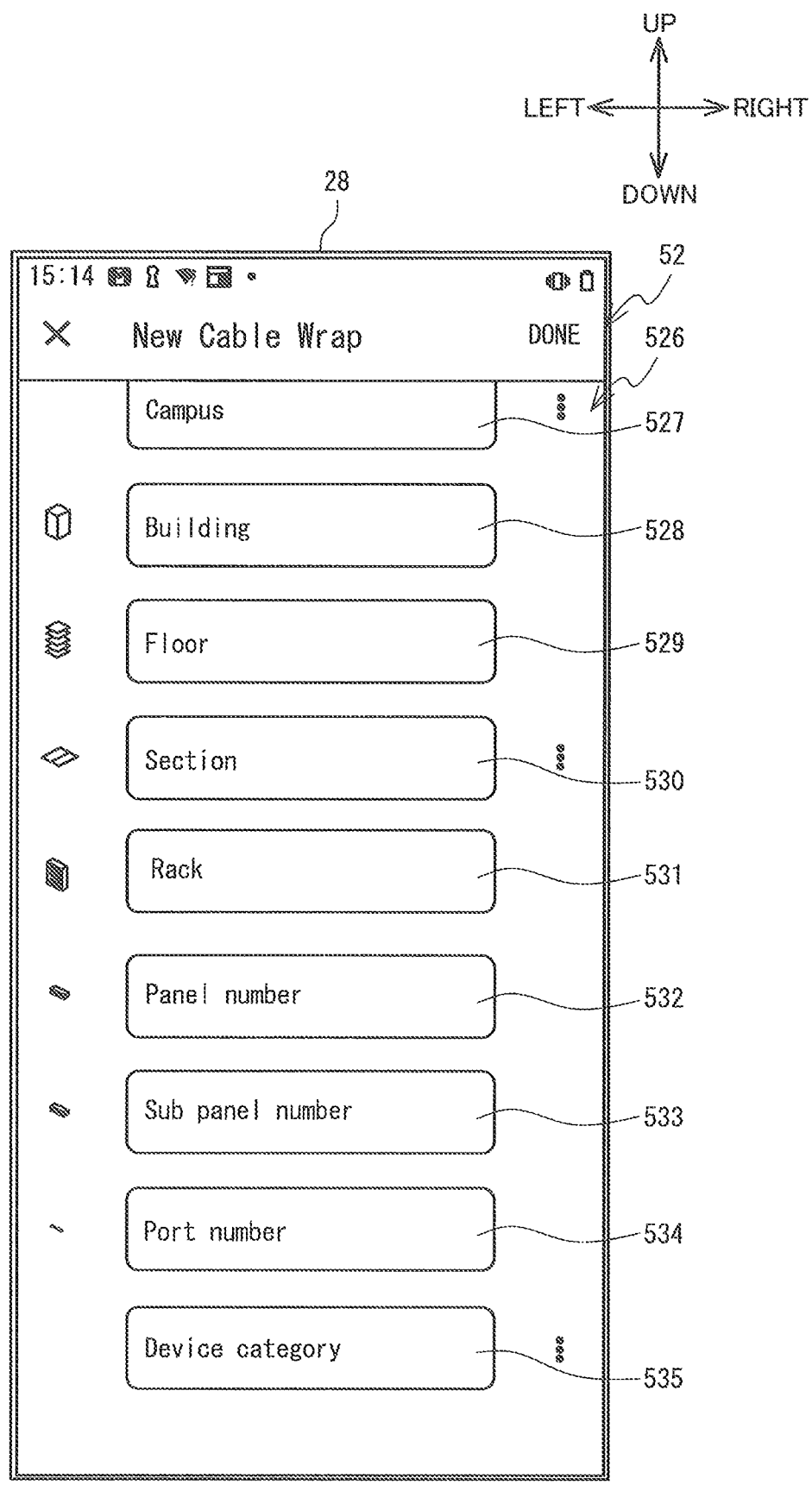
FIG. 8 is a diagram of the second half illustrating a state in which standard input fields in the TIA standard are additionally displayed on the new creation screen of the cable wrap displayed on the display.

When the CPU 21 detects that the checkbox 523A is touched by the user by the output from the touch panel 25, the CPU 21 determines an execution of creation of the label in accordance with the TIA standard (S7: YES), and the CPU 21 displays a check mark (not illustrated) in the checkbox 523A. At the same time, as illustrated in FIG. 7 and FIG. 8, the CPU 21 additionally displays, on the new creation screen 52, a setting screen 524 for the cable to which the label in accordance with the TIA standard is stuck, standard input fields 527 to 534 in which information in accordance with the TIA standard is input, and a category input field 535 of the device in addition to the attribute information input field 520 (S8). A screen corresponding to a part of the new creation screen 52 in which the standard input fields 527 to 534 and the category input field 535 of the device are displayed is referred to as a standard input screen 526.

The setting screen 524 will be explained with reference to FIG. 7. As illustrated in FIG. 7, the setting screen 524 is displayed below the standard label editing instruction field 523. On the setting screen 524, a cable selection field 524A for selecting whether the cable to which the label is stuck is a patch code or a code for a permanent link is displayed on an upper side of the setting screen 524. When the cable to which the label is stuck is the patch code, "PATCH" is selected by the user. When the cable to which the label is stuck is for the permanent link, "PERMANENT" is selected by the user. When one of the "PATCH" and "PERMANENT" is selected, the CPU 21 stores information of selected one into the RAM 23, and displays, under the selected one, a bar 524B indicating that the selection has been made.

Figure 13A:
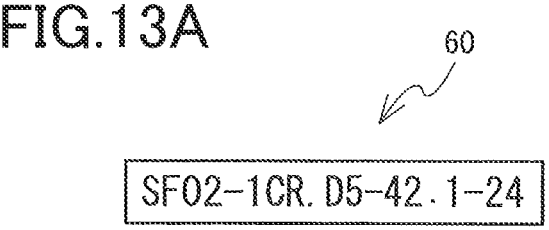
FIG. 13A is view illustrating a state in which a label in the TIA standard is displayed.
Figure 13B:
FIG. 13B is a view illustrating a state in which a label in the TIA standard is displayed.

A selection field 524C for selecting (1), as illustrated in FIG. 13A, "From only" in which the label to be created indicates information of only one terminal of the cable or (2), as illustrated in FIG. 13B, "From/To" in which the label indicates information of both terminals of the cable is provided below the cable selection field 524A on a right end side of the setting screen 524. On a left side of the selection field 524C, "Location From only or From/to" is displayed. "1" and "2" are displayed in the selection field 524C.

When "1" is selected by the user, the CPU 21 stores information of selecting "From only" in the RAM 23 and displays, under the "1", a bar 524D indicating that selection has been made.

When "2" is selected by the user, the CPU 21 stores information of selecting "From/To" in the RAM 23 and displays, under the "2", the bar 524D indicating that selection has been made.

On a lower side of the selection field 524C, a selection field 524E of a line for selecting whether the line in which the cable is used is one line or two lines is provided. On a left side of the selection field 524E, "Line From and To in 1 line or 2 line" is displayed. "1" and "2" are displayed in the selection field 524E. When "1" is touched by the user, the CPU 21 stores information of selected "1 line" into the RAM 23 and displays, under the "1", a bar 524F indicating that the selection has been made. When "2" is touched by the user, the CPU 21 stores information of selected "2 line" into the RAM 23 and displays, under "2", the bar 524F indicating that the selection has been made. Therefore, in an example illustrated in FIG. 7, an instruction for creating a label for a cable of one line in "From only" indicating information of only one side of the cable is input.

Next, the standard input screen 526 will be explained with reference to FIG. 7 and FIG. 8. The standard input screen 526 is displayed below the setting screen 524. An upper part of the standard input screen 526 is displayed in FIG. 7 and a remaining part of the standard input screen 526 is displayed so as to be seen in FIG. 8. FIG. 8 illustrates a state where the standard input screen 526 illustrated in FIG. 7 is scrolled in a lower direction. As illustrated in FIG. 7 and FIG. 8, the standard input fields 527 to 534 are displayed on the standard input screen 526 in a line from upper to lower side in this order. In the example, the standard input fields 527 to 534 are displayed in a line from upper to lower side in accordance with the TIA standard. Character strings as information input in the standard input fields 527 to 534 are stored into the RAM 23. The category input field 535 of the device is displayed below the standard input field 534.

The standard input field 527 is an input field for campus information. The campus information is information indicating geographically concentrated areas such as a campus of a university, a factory of a company, and a military base, where the cable is used. As an example of campus information, a character string "SF0" is input. The standard input field 528 is an input field for building information. For example, a number indicating a building where the cable is used is input in the standard input field 528. For example, a character string "2" is input. The standard input field 529 is an input field for floor information. For example, a numeral indicating a floor (floor number) of the building is input in the standard input field 529. For example, a character string "1" is input in a case of a first floor.

The standard input field 530 is an input field for section information. For example, information indicating a section as a given place where the cable is used in the floor indicated by information input in the standard input field 529 is input in the standard input field 530. For example, a character string "CR" is input. The standard input field 531 is an input field for rack information. For example, information indicating a rack to which the patch panel where the cable is used is fixed is input in the standard input field 531. For example, a character string "D5" is input. The standard input field 532 is an input field for a panel number of the patch panel. For example, a panel number of the patch panel where the cable is used is input in the standard input field 532. For example, a character string "42" is input. The standard input field 533 is an input field for a number of a sub-panel. When the sub-panel is provided, for example, a number of the sub-panel where the cable is used is input in the standard input field 533. When the sub-panel does not exist, the number of the sub-panel is not input. The standard input field 534 is an input field for a port number of the patch panel. For example, a port number of the patch panel to which the cable is connected is input in the standard input field 534. For example, a character string "1-24" is input. The category input field 535 is an input field for a category of the device of the patch panel.

When the CPU 21 detects that "DONE" at an upper right on the new creation screen 52 has been touched by the user based on the output from the touch panel 25, the CPU 21 determines that the input is completed (S9: YES). When the CPU 21 does not detect that "DONE" has been touched, the CPU 21 continues determination of S9 (S9: NO). In the case where the CPU 21 determines that the input is completed (S9: YES), when the CPU 21 detects that a print button (not illustrated) has been touched on the character input screen based on the output from the touch panel 25, the CPU 21 determines printing (S12: YES) and creates printing data based on setting data input to the setting field 521 and information (character strings) in accordance with the TIA standard input in the standard input fields 527 to 534 and stored in the RAM 23 (S13). For example, in a case of the new creation screen 52, when the label width is "12 mm", the diameter type of the cable is "CAT/5/6", and the label length is "12 mm", and character strings as information respectively input in the standard input fields 527 to 532, 534 are "SF0", "2", "1", "CR", "D5", "42", and "1-24", as illustrated in FIG. 13A, the CPU 21 inserts delimiters which are prescribed delimiting characters in accordance with the TIA standard. As examples of delimiters, "-" is inserted between the "2" and "1", "." is inserted between "CR" and "D5", "-" is inserted between "D5" and "42", and ":" is inserted between "42" and "1-24".

In the creation processing of printing data (S13), when there exists a standard input field in which information is not input in the standard input fields 527 to 534, printing data in accordance with the TIA standard is created by cutting a part corresponding to an unentered standard input field. That is, when there exists a standard input field in which information is not input, the CPU 21 creates printing data in accordance with the TIA standard without containing the part corresponding to the standard input field in which information is not input. In the above example, the standard input field 533 for the sub-panel number is not input; therefore, as illustrated in FIG. 13A, printing data is created by cutting the part corresponding to the standard input field 533 for the sub-panel number. That is, the CPU 21 creates printing data so that information input in the standard input field 534 which is one field after the unentered standard input field 533 is printed continuously after information input in the standard input field 532 which is one field before the unentered input field 533 without leaving a blank part corresponding to the unentered standard input field 533. Subsequently, the CPU 21 transmits the created printing data to the printing apparatus 7 (S14). For example, the CPU 21 transmits the printing data to the CPU 71 from the communication I/F 30 via the router 8 through the communication I/F 76 of the printing apparatus 7 (S14). Then, the CPU 21 ends the printing data creation processing.

When "2" is selected by the user in the selection screen 524C, the CPU 21 stores information of selected "From/To" into the RAM 23 and displays, under "2", the bar 524D indicating that the selection has been made. In this case, the CPU 21 also displays, in the standard input screen 526, standard input fields on a "TO" side (right side of "/" illustrated in FIG. 13B) similar to the standard input fields 527 to 534 in addition to the standard input fields 527 to 534 on a "From" side (left side of "/" illustrated in FIG. 13B). In this case, in the creation processing of printing data (S13), the CPU 21 creates printing data of a label 61 of "From/To" illustrated in FIG. 13B.

In a case where the checkbox 523A for instructing creation of the label in accordance with the TIA standard in the new creation screen 52 illustrated in FIG. 6 is not touched (S7: NO), when the CPU 21 detects that "DONE" at the upper right on the new creation screen 52 has been touched by the user based on the output from the touch panel 25, the CPU 21 determines that the input is completed (S10: YES). When the CPU 21 does not detect that the "DONE" has been touched, the CPU 21 continues determination of S10 (S10: NO). When the CPU 21 determines that the setting input is completed (S10: YES), the character input screen (not illustrated) is displayed on the display 28 in the same manner as the above (S11). The CPU 21 stores input character data into the RAM 23.

Next, a case where the selection field 43 of the cable flag on the category selection screen 40 illustrated in FIG. 4 is touched will be explained with reference to FIG. 3, FIG. 9, and FIG. 10. When the CPU 21 determines that the selection field 43 on the category selection screen 40 has been touched (S2: YES), the CPU 21 displays a template selection screen 43A for the cable flag illustrated in FIG. 9 on the display 28. On the template selection screen 43A, templates 431 to 435 and a new creation button 436 are displayed. For example, the template 431 corresponds to a diameter 3 mm of the cable and a length 20 mm of the flag. The template 432 corresponds to a diameter 6 mm of the cable and a length 20 mm of the flag. The template 433 corresponds to a diameter 3 mm of the cable and a length 30 mm of the flag. The template 434 corresponds to a diameter 6 mm of the cable and a length 30 mm of the flag. The template 435 corresponds to a diameter 3 mm of the cable and a length 40 mm of the flag. When one of the templates 431 to 435 is selected (S4: YES), the CPU 21 displays the character input screen in the same manner as described above (S11).

Figure 9:
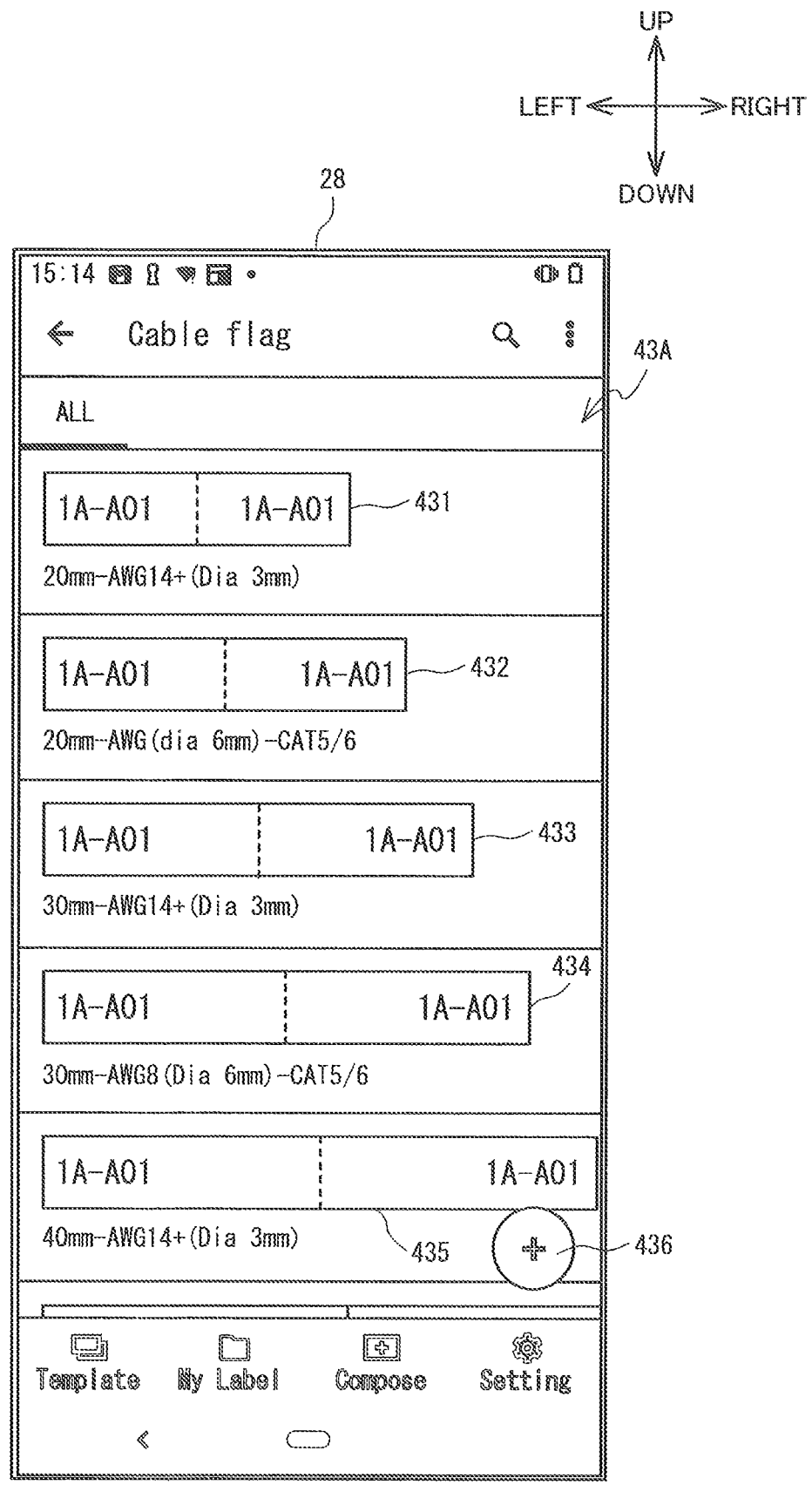
FIG. 9 is a diagram illustrating a state in which a template selection screen of a cable flag is displayed on the display.

When the CPU 21 determines that the new creation button 436 on the template selection screen 43A illustrated in FIG. 9 has been touched by the user based on the position information from the touch panel 25 (S4: NO, S5: YES), the CPU 21 determines that new creation of printing data is executed without using a template. The CPU 21 reads information of a new creation screen 54 (see FIG. 10) of the cable flag corresponding to the category (cable flag) selected at S2 from the new creation screen storage area 245 of the storage 24 and displays the new creation screen 54 on the display 28 (S6).

Figure 10:
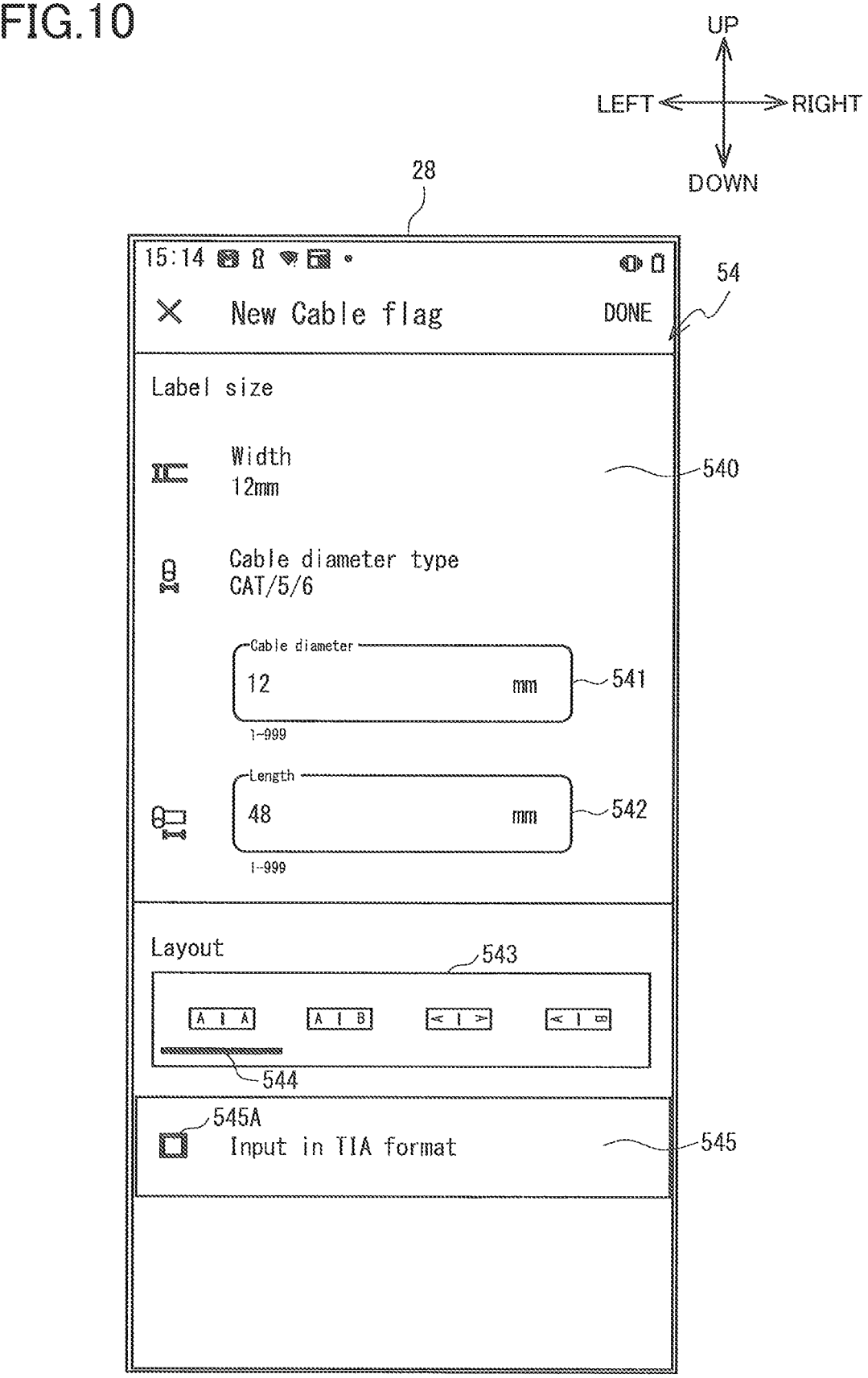
FIG. 10 is a diagram illustrating a state in which a new creation screen of the cable flag is displayed on the display.

On the new creation screen 54 illustrated in FIG. 10, an attribute information input field 540 for a label to be created is displayed. In the attribute information input field 540, a width of the label to be created (Width), a diameter type of the cable to which the label is stuck (Cable diameter type), a setting field 541 for a diameter of the cable (Cable diameter), and a setting field 542 for a length of the label to be created (Length) are displayed. Regarding the width of the label, the CPU 21 displays a numeral of the width of the label based on information of the type of the tape 104 detected by the detector 77 of the printing apparatus 7 and transmitted to the mobile terminal 2. For example, when the width of the tape 104 is 12 mm, the CPU 21 displays "Width 12 mm". Regarding the diameter type of the cable, for example, "CAT/5/6" which is the standard of the LAN cable is displayed as the initial value. In the setting field 541 for the diameter of the cable, a value of the diameter of the cable to which the created label is stuck can be input from the touch panel 25. In the example illustrated in FIG. 10, "12 mm" is input. A range of the diameter which can be input in the setting field is displayed under the setting field 541. As an example, "1-999" is displayed. In the setting field 542 for the length of the label, a length of the label to be created can be input from the touch panel 25. In the example illustrated in FIG. 10, "48 mm" is input. A range of the lengths which can be input to the setting field is displayed under the setting field 542. As an example, "1 to 999" is displayed.

A setting field 543 for a layout of characters to be printed on the label is provided below the label attribute information input field 540. When one of layouts is touched, the CPU 21 displays, under the selected layout, a bar 544 indicating that the selection has been made. A standard label editing instruction field 545 for instructing edition of the standard label in accordance with the prescribed standard is provided below the setting field 543 for the layout. An example of the prescribed standard is the TIA standard. In the standard label editing instruction field 545, a checkbox 545A to be checked when creating the label in accordance with the TIA standard is provided on a left end as an example. "Input in TIA format" is displayed on a right side of the checkbox 545A, and indicates that input in accordance with the TIA standard is executed.

When the CPU 21 detects that the checkbox 545A is touched by the user based on the output from the touch panel 25, the CPU 21 determines an execution of creation of the label in the TIA standard (S7: YES), the CPU 21 displays a check mark (not illustrated) in the checkbox 545A. At the same time, the CPU 21 additionally displays, below the standard label editing instruction field 545 on the new creation screen 54, a setting screen for the cable (not illustrated), standard input fields, and a category input field (not illustrated) similar to the setting screen 524 for the cable, the standard input fields 527 to 534, and the category input field 535 illustrated in FIG. 7 and FIG. 8(S8). Subsequent processing is the same as the above S9 to S14, the explanation is omitted.

Next, a case where the selection field 44 of the die-cut flag on the category selection screen 40 illustrated in FIG. 4 is touched will be explained with reference to FIG. 3, FIG. 11 and FIG. 12. In a case where the CPU 21 determines that the selection field 44 of the category selection screen 40 has been touched (S2: YES), the CPU 21 displays a template selection screen 44A for the die cut flag illustrated in FIG. 11 on the display 28. On the template selection screen 44A, templates 441, 442, and a new creation button 443 are displayed. For example, the template 441 is a template in which characters are printed in the same direction at an upper part and a lower part in the width direction of the label. The template 442 is a template in which characters are printed in inverted directions at the upper part and the lower part in the width direction of the label. When one of templates 441, 442 is selected (S4: YES), the CPU 21 displays the character input screen in the same manner as described above (S11).

Figure 11:
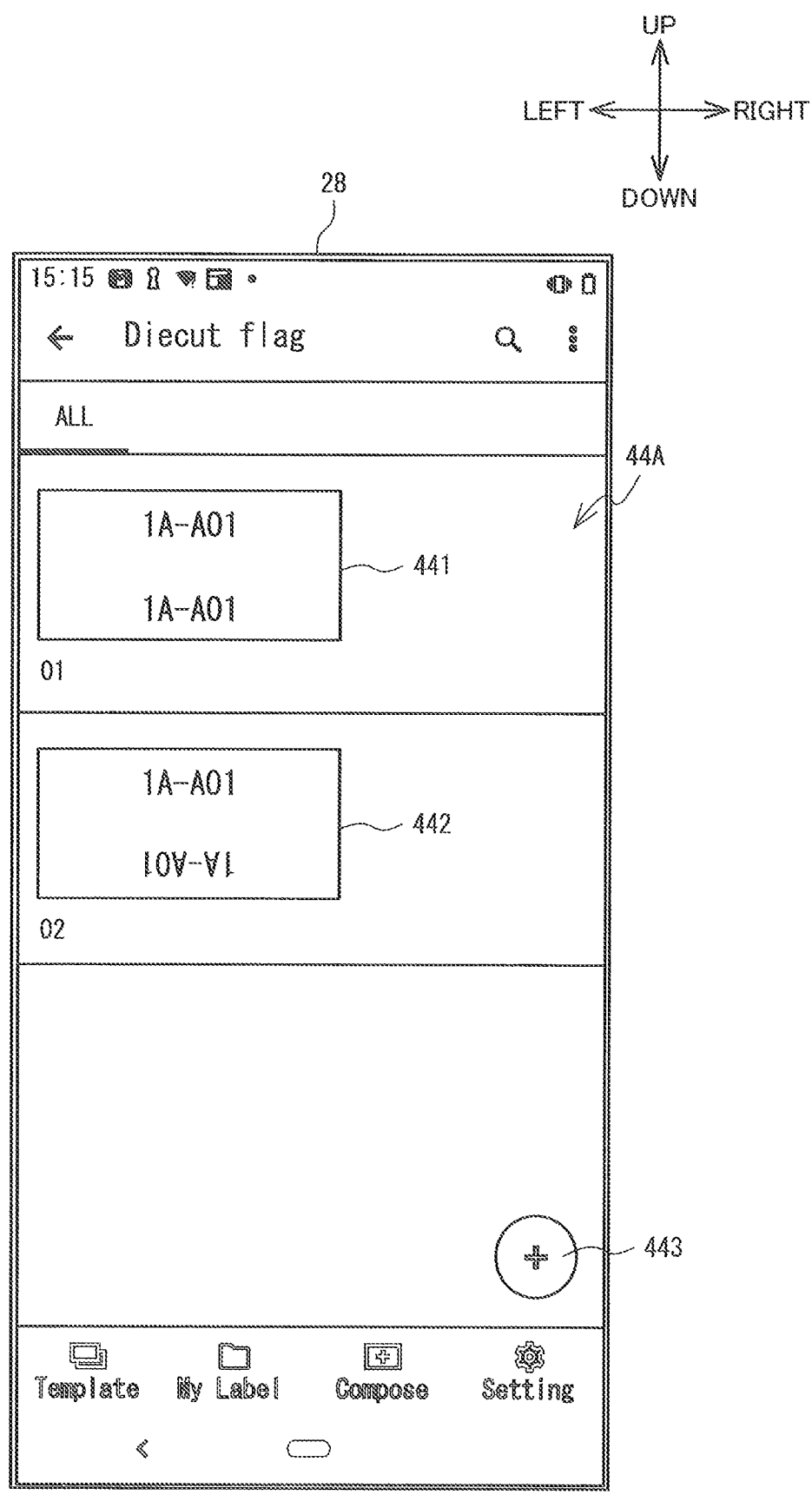
FIG. 11 is a diagram illustrating a state in which a template selection screen of a die-cut flag is displayed on the display.

When the CPU 21 determines that the new creation button 443 on the template selection screen 44A illustrated in FIG. 11 has been touched by the user based on the position information from the touch panel 25 (S4: NO, S5: YES), the CPU 21 determines that new creation of printing data is executed without using the template. The CPU 21 reads information of a new creation screen 55 (see FIG. 12) for the die-cut flag corresponding to the category (die-cut flag) selected at S2 from the new creation screen storage area 245 of the storage 24, and displays the new creation screen 55 on the display 28 (S6).

Figure 12:
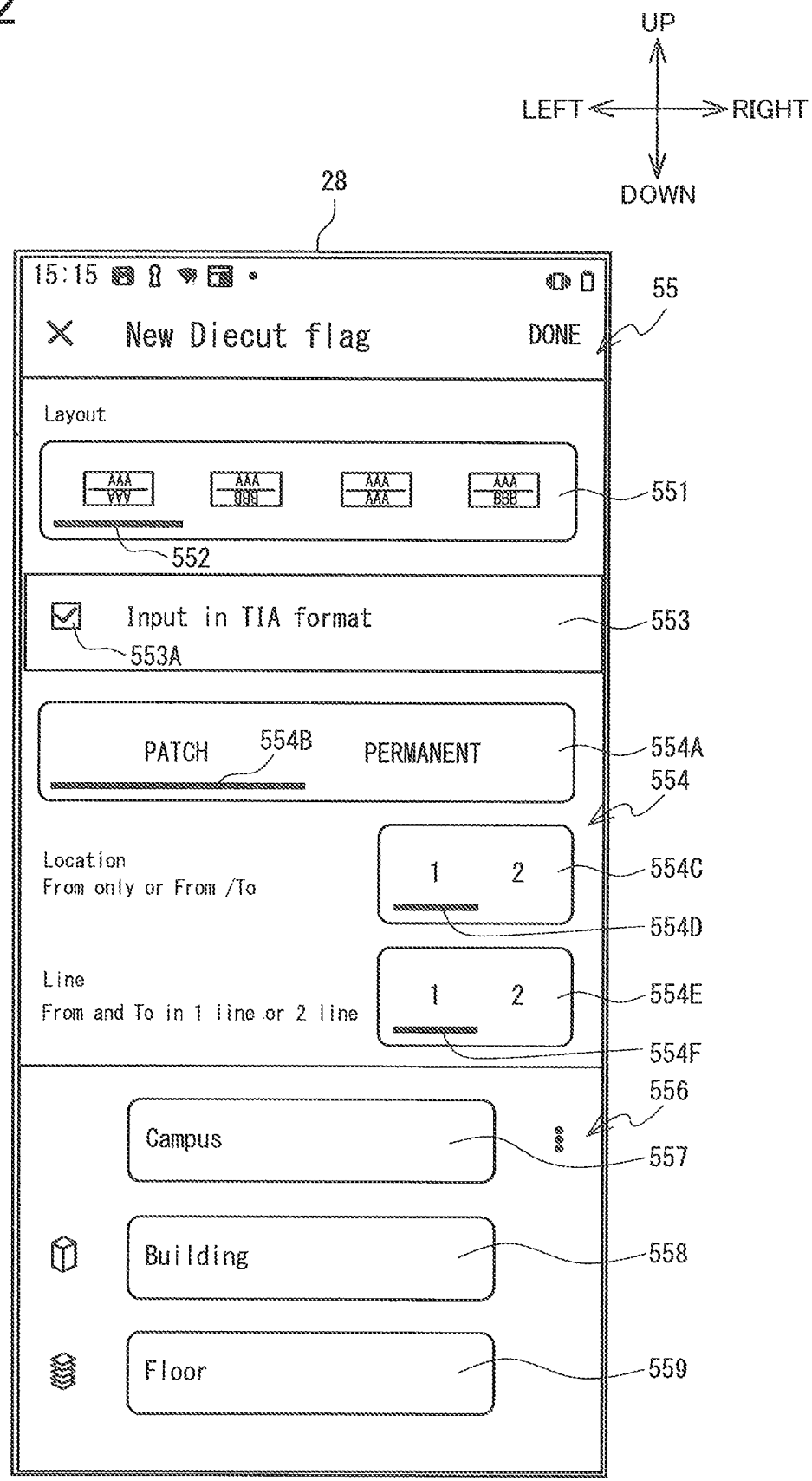
FIG. 12 is a diagram illustrating a state in which a new creation screen of the die-cut flag is displayed on the display.

On the new creation screen 55 illustrated in FIG. 12, a setting field 551 for a layout of characters to be printed on the label is provided. When one of layouts is touched, the CPU 21 displays, under the selected layout, a bar 552 indicating that the selection has been made. A standard label editing instruction field 553 for instructing edition of a standard label in accordance with a prescribed standard is provided below the setting field 551 for the layout. An example of the prescribed standard is the TIA standard.

In the standard label editing instruction field 553, a checkbox 553A to be checked when the label in accordance with the TIA standard is created is provided on a left end as an example. "Input in TIA format" is displayed on a right side of the checkbox 553A, and indicates that the input in the TIA standard is executed.

When the CPU 21 detects that the checkbox 553A is touched by the user based on the output from the touch panel 25, the CPU 21 determines an execution of creation of the label in accordance with the TIA standard (S7: YES), and displays a check mark (not illustrated) in the checkbox 553A. At the same time, as illustrated in FIG. 12, the CPU 21 additionally displays, below the setting screen 551 for the layout on the new creation screen 55, a setting screen 554 for the cable to which the label in the TIA standard is stuck, standard input fields 557 to 559 in which information in accordance with the TIA standard is input, and standard input fields (not illustrated) similar to the standard input fields 530 to 534 of FIG. 8 (S8). Subsequent processing is the same as the above S9 to S14; therefore, the explanation is omitted.

As described above, even when the user does not know the contents of the TIA standard and the like, the standard input fields 527 to 534 are additionally displayed on the new creation screen 52, and the standard input fields 557 to 559 and the like are additionally displayed on the new creation screen 55 in the embodiment, therefore, printing data of the standard label in accordance with the prescribed standard can be easily created. Moreover, when there exists a standard input field in which information is not input in the creation of printing data (S13), the CPU 21 creates the printing data in accordance with the TIA standard by cutting a part corresponding to an unentered standard input field; therefore, printing data of a good-looking standard label can be created. Moreover, the CPU 21 inserts prescribed delimiters between a first character string and a second character string input in accordance with the TIA standard in the creation of printing data (S13), therefore, a trouble of inputting delimiters can be reduced. The CPU 21 displays the standard input fields 527 to 534 in a line in the order in accordance with the standard in the additional display of the TIA standard (S8), therefore, it is possible to create printing data of the label in accordance with the prescribed standard without making a mistake in the input order.

The CPU 21 displays the category selection screen 40 prompting the selection of the category on the display 28 as illustrated in FIG. 4, and executes a display processing (S6) of the new creation screen that displays the new creation screens 52, 54, and 55 respectively corresponding to the categories selected by instruction from the touch panel 25 as the input unit. Accordingly, when it is necessary to input a character string in accordance with the prescribed standard in the category of the label to be created, printing data of the label in accordance with the prescribed standard can be easily created. Furthermore, the template selection screens 42A, 43A, 44A, 45A, 46A, 47A, and 48A are displayed on the display 28 by the template display processing (S3) in the embodiment, therefore, printing data of the label can be easily created by using the template.

In the above embodiment, the mobile terminal 2 is an example of a "printing data creating apparatus" in the present disclosure. The display 28 is an example of a "display" in the present disclosure. The communication I/F 30 is an example of a "transmitter" in the present disclosure. The CPU 21 is an example of a "controller or CPU" in the present disclosure. The touch panel 25 is an example of an "input unit" in the present disclosure. The storage 24 is an example of a "storage" in the present disclosure. The new creation screens 52, 54, 55 are examples of a "label creation screen" in the present disclosure. The standard label editing instruction fields 523, 545, and 553 are examples of a "standard label instruction field" in the present disclosure. The communication I/F 76 is an example of a "receiver" in the present disclosure. The standard input fields 527 to 534, 557 to 559 are examples of a "standard input field" in the present disclosure. The category selection screen 40 is an example of a "category selection screen" in the present disclosure. "2" input in the standard input field is an example of the first character string, "1" is an example of the second character string, "CR" is an example of the first character string, "D5" is an example of the second character string, "D5" is an example of the first character string, "42" is an example of the second character string, "42" is an example of the first character string, and "1-24" is an example of the second character string.

Figure 14:
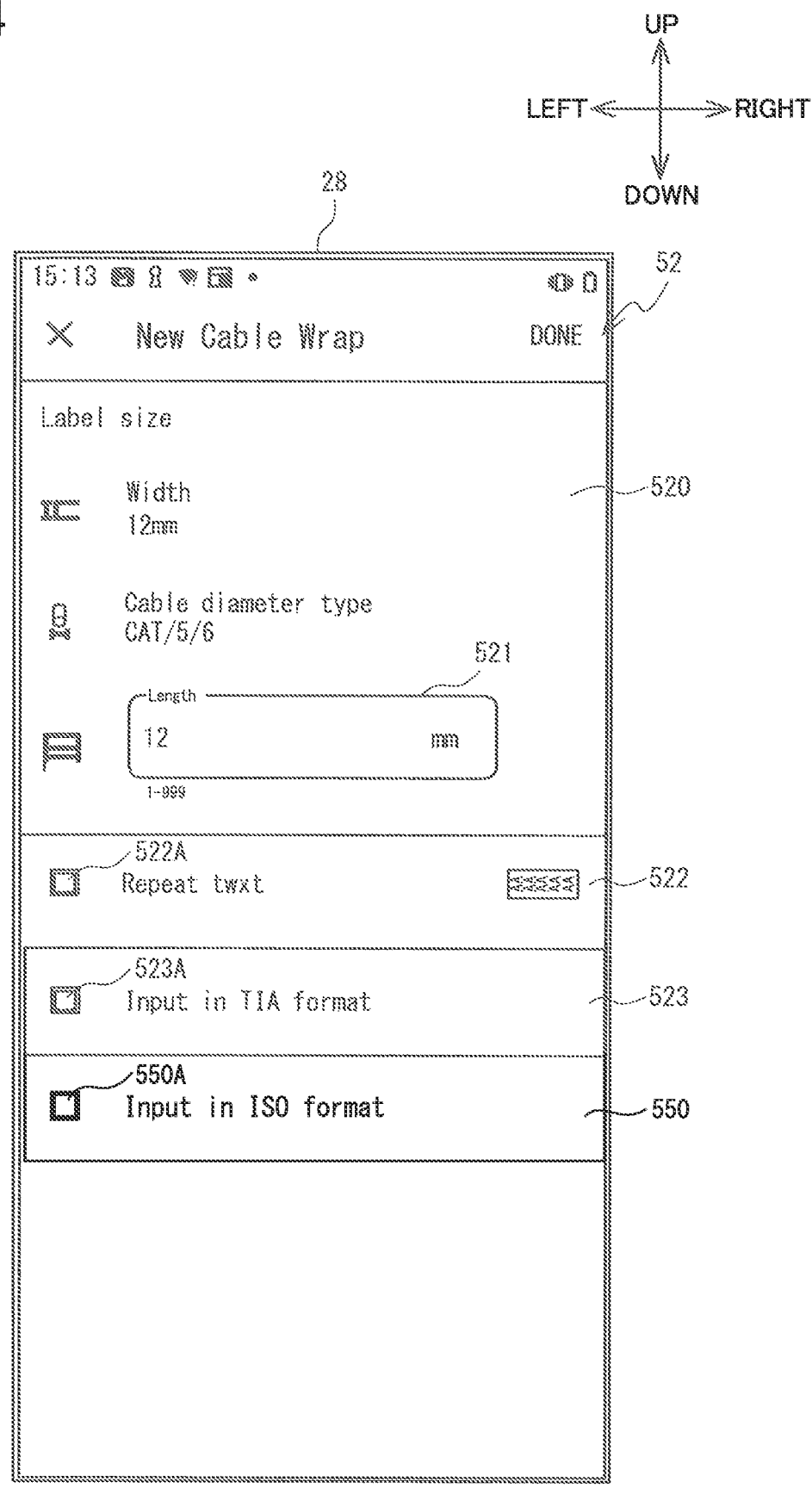
FIG. 14 is a diagram illustrating a state in which the new creation screen of the cable wrap is displayed on the display.

The present disclosure is not limited to the above embodiment and may be modified in various manners within a scope not departing from the gist of the present disclosure. For example, the prescribed standard is not limited to the TIA standard, and may be an ISO standard, a JIS standard and the like. As illustrated in FIG. 14, the CPU 21 may display, below the standard label editing instruction field 523 on the new creation screen 52, a standard change field 550 configured to instruct the change to creation of a label in a standard different from the TIA standard, for example, a label in the ISO standard. In the standard change field 550, a checkbox 550A to be checked when creating the label in the ISO standard is provided at a left end of the standard change field 550. In this case, printing data of the standard label in a different standard can be created. It is preferable to display a mark for promoting awareness such as "*" regarding an essential item in the standard input fields 527 to 534. The mobile terminal 2 is not limited to a smartphone, but may be a tablet computer, a personal computer and the like. The input unit is not limited to the touch panel 25, but may be a keyboard and the like connected to the mobile terminal 2 through wired or wireless communication. The new creation screens 52, 54, and 55 are not limited to illustrated ones, but may be suitably altered as long as the screen is provided with setting fields and standard input fields for setting data of the label corresponding to the selected category of the label. The category setting screen 40 is not limited to one illustrated in FIG. 4, but may be suitably altered. Furthermore, the tape 104 is not limited to the indefinite-length adhesive tape with release paper, but may be a tape without release paper, a thermal tape or the like.

What is claimed is:

1. A printing data creating apparatus, comprising:
a display configured to display an image;
a transmitter configured to transmit printing data to a printing apparatus which prints a cable-label to be attached to a cable;
a controller;
an input unit to which an instruction for the controller is input; and
a storage storing a program for controlling the controller, wherein the controller is configured to
    display, on the display, cable-label creation screen for the cable-label including a label size input field to which a size of the cable-label is input, and a standard label instruction field for instructing edition of a standard cable-label in accordance with a prescribed standard,
    when the standard label instruction field is operated by input to the input unit, display, on the cable-label creation screen, a plurality of standard input fields in addition to the label size input field, each of the plurality of standard input fields being an input field to which standard information related to a place where cable, on which the cable-label is attached, is installed in accordance with the prescribed standard, is input,
    create printing data of the standard cable-label based on the standard information input in the plurality of standard input fields, and
    transmit the created printing data of the standard cable-label from the transmitter to the printing apparatus.

2. The printing data creating apparatus according to claim 1, wherein, in a case where at least one of the plurality of standard input fields is an unentered standard input field, the controller configured to create printing data of the standard cable-label without containing information corresponding to the unentered standard input field, the unentered standard input field being an input field to which standard information to be input to the unentered standard input field is not input.

3. The printing data creating apparatus according to claim 1, wherein the controller is configured to display, on the cable-label creation screen, a standard change field configured to instruct edition of the cable-label in accordance with a different standard which is different from the prescribed standard.

4. The printing data creating apparatus according to claim 1, wherein the controller is configured to create printing data in which a delimiter is inserted between a first character string and a second character string respectively input in a first input field and a second input field which are adjacent to each other in the plurality of standard input fields.

5. The printing data creating apparatus according to claim 1,
wherein the controller is configured to display, on the cable-label creation screen, the plurality of standard input fields in a line in an order in accordance with the prescribed standard.

6. The printing data creating apparatus according to claim 1, wherein the controller is configured to:
display, on the display, a category selection screen configured to prompt selection of a category of the cable-label to be created by the printing apparatus; and
display, on the display, the cable-label creation screen corresponding to the category selected by an instruction to the input unit.

7. The printing data creating apparatus according to claim 1, wherein the prescribed standard is a TIA standard.

8. The printing data creating apparatus according to claim 1, wherein the prescribed standard is an ISO standard.

9. A non-transitory storage medium storing a program readable by a computer of a printing data creating apparatus, the printing data creating apparatus comprising a display configured to display an image, a transmitter configured to transmit printing data to a printing apparatus which prints a cable-label to be attached to a cable, and an input unit to which an instruction is input,
- wherein, when executed by the computer, the program causes the printing data creating apparatus to
- display, on the display, a cable-label creation screen for the cable-label including a label size input field to which a size of the cable-label is input, and a standard label instruction field for instructing edition of a standard cable-label in accordance with a prescribed standard,
- when the standard label instruction field is operated by input to the input unit, display, on the cable-label creation screen, a plurality of standard input fields in addition to the label size, input field, each of the plurality of standard input fields being an input field to which standard information related to a place where the cable, which the cable-label is attached, is installed in accordance with the prescribed standard, is input,
- create printing data of the standard cable-label based on the standard information input in the plurality of standard input fields; and
- transmit the created printing data of the standard cable-label from the transmitter to the printing apparatus.

10. A printing system, comprising:
a printing data creating apparatus; and
a printing apparatus which prints a cable-label to be attached to a cable, by printing data transmitted from the printing data creating apparatus,
- wherein the printing data creating apparatus includes a display configured to display an image, a transmitter configured to transmit printing data to the printing apparatus, a controller, an input unit to which an instruction for the controller is input, and a storage storing a program for controlling the controller,
- wherein the controller is configured to
- display, on the display, a cable-label creation screen for the cable-label, including a label size input field to which a size of the cable-label is input, and a standard label instruction field for instructing edition of a standard cable-label in accordance with a prescribed standard;
- when the standard label instruction field is operated by input to the input unit, display, on the cable-label creation screen, a plurality of standard input fields in addition to the label size input field, each of the plurality of standard input fields being an input field to which standard information related to a place where the cable, on which the cable-label is attached, is installed in accordance with the prescribed standard, is input;
- create printing data of the standard cable-label based on the standard information input in the plurality of standard input fields; and
- transmit the created printing data of the standard cable-label from the transmitter to the printing apparatus, and
- wherein the printing apparatus includes a receiver configured to receive the printing data, and a printing unit configured to print the label based on the printing data received by the receiver.

11. A printing data creating apparatus, comprising:
a display configured to display an image;
a transmitter configured to transmit printing data to a printing apparatus which prints a cable-label to be attached to a cable;
a controller;
an input unit to which an instruction for the controller is input; and
a storage storing a program for controlling the controller,
wherein the controller is configured to
- display, on the display device, a cable-label editing screen containing a plurality of standard input fields to which information related to a place where the cable, on which the cable-label is attached, is installed in accordance with a prescribed standard, is input; and
- create printing data in which at least one delimiter is inserted between a first character string and a second character string respectively input in a first input field and a second input field adjacent to each other in the plurality of standard input fields.

* * * * *

UNITED STATES PATENT AND TRADEMARK OFFICE
CERTIFICATE OF CORRECTION

| | |
|---|---|
| PATENT NO. | : 11,712,903 B2 |
| APPLICATION NO. | : 17/152938 |
| DATED | : August 1, 2023 |
| INVENTOR(S) | : Ryo Yasui and Jun Komura |

Page 1 of 1

It is certified that error appears in the above-identified patent and that said Letters Patent is hereby corrected as shown below:

In the Claims

Claim 1, Column 14, Line 12:
Please change: "display, on the display, cable-label creation screen for" to -- display, on the display, a cable-label creation screen for --

Claim 1, Column 14, Line 24:
Please change: "where cable, on which the cable-label is attached, is" to -- where the cable, on which the cable-label is attached, is --

Claim 9, Column 15, Line 21:
Please change: "addition to the label size, input field, each of the" to -- addition to the label size input field, each of the --

Signed and Sealed this
Seventh Day of November, 2023

Katherine Kelly Vidal
*Director of the United States Patent and Trademark Office*